United States Patent [19]

Harris

[11] 4,075,961
[45] Feb. 28, 1978

[54] INJURY PROTECTION DEVICE FOR MACHINERY

[75] Inventor: William Donald Harris, Greensboro, N.C.

[73] Assignee: Burlington Industries, Inc., Greensboro, N.C.

[21] Appl. No.: 684,319

[22] Filed: May 7, 1976

[51] Int. Cl.$^2$ ............................................. D05B 69/36
[52] U.S. Cl. .............................. 112/277; 192/129 A; 361/179
[58] Field of Search .......... 112/219 A, 219 R, 121.11, 112/277; 192/129 A; 340/279; 307/116; 318/16; 361/179

[56] References Cited

U.S. PATENT DOCUMENTS

| | | | |
|---|---|---|---|
| 2,313,917 | 3/1943 | Brownlee | 192/129 A |
| 2,418,356 | 4/1947 | Kleber | 112/219 R |
| 3,177,481 | 4/1965 | Joy et al. | 340/279 |
| 3,218,530 | 11/1965 | Momberg et al. | 318/16 |
| 3,785,230 | 1/1974 | Lokey | 192/129 A |
| 3,953,770 | 4/1976 | Hayashi | 307/116 X |

Primary Examiner—Werner H. Schroeder
Assistant Examiner—Peter Nerbun
Attorney, Agent, or Firm—Cushman, Darby & Cushman

[57] ABSTRACT

A system for producing a control signal upon intrusion of a human part into a protected area, for example the area about the needle of a sewing machine, whereby radio frequency signals at a predetermined frequency are coupled to the human machine operator from a plate on which he sits or stands. As the operator's fingers or other body part approaches the protected area, an antenna receives the rf signal and applies it to an rf phase lock loop receiver which produces an output pulse when the received signal is at the predetermined frequency and is above a predetermined amplitude to operate solenoids which prevent or terminate machine operation. Preferably, withdrawal of the body part triggers a timer which produces a signal permitting the machine to operate for a given time which is greater than the normal time between intrusions, thus continuously checking that the system is working properly.

16 Claims, 3 Drawing Figures

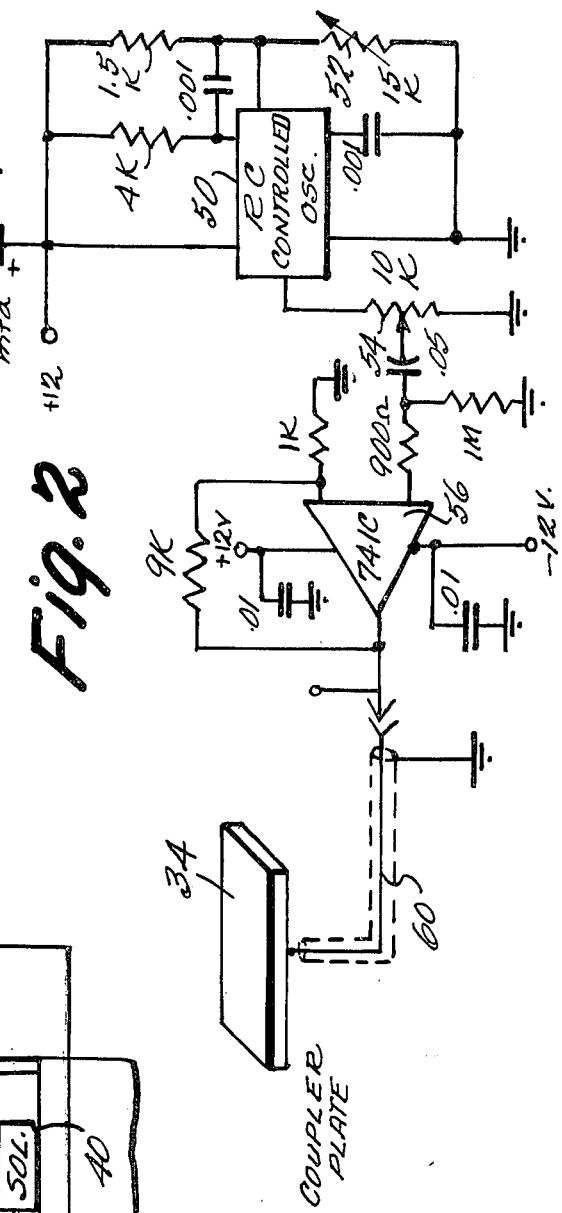
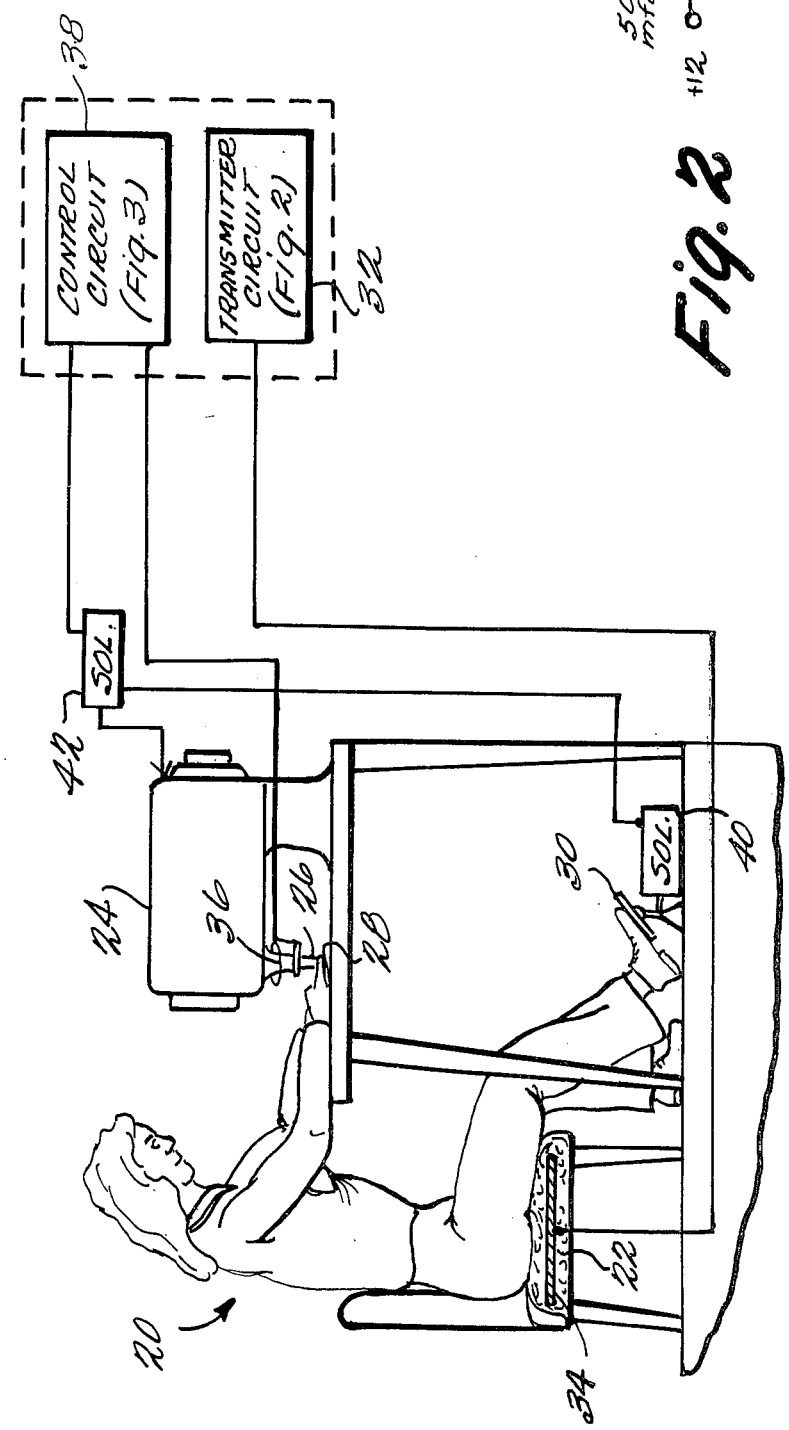
Fig. 2
Fig. 1

INJURY PROTECTION DEVICE FOR MACHINERY

BRIEF DESCRIPTION OF THE PRIOR ART AND SUMMARY OF THE INVENTION

The invention relates to a system for producing a control signal upon intrusion of an operator into a predetermined protected area of a machine.

Many, if not most, machines have dangerous areas with parts which will maim or remove fingers or other body parts if inserted during operation. Often the operator must repeatedly reach into the area between operations to perform some task so that a moment's confusion can result in permanent injury or death. Accordingly, many devices have been developed to prevent operation of a machine while fingers or the like are in a dangerous area.

One way that this can be accomplished is to generate a field about the area so that intrusion by a hand disrupts the field in a way which can be readily detected. The U.S. Patent to Erichsen, No. 3,896,425, for example, describes a system in which intrusion into an area bounded by conductors produces a signal.

Another system which is used has a plastic transparent gate which must be lowered between operator and machine to trip a switch before the machine itself can operate. Other systems detect the capacitance of a body part, provide a light beam which is broken to detect intrusion, etc.

The difficulty with these systems is that most are bulky and interfere with the operation of the machine reducing worker efficiency and, in many instances, pay. Further, these systems in general lack reliability and are too expensive.

The present invention relates to a system which is simple, inexpensive and unobtrusive. A radio frequency signal at a given frequency is coupled to the human operator via a metal plate on which the operator sits or stands. As the operator's fingers or other body parts approach the protected area, a simple sensor antenna receives the rf signal from the operator. When the detected signal reaches a predetermined amplitude indicating intrusion and is determined to be at the correct frequency, a disable signal is produced which prevents operation or stops operation of the machine.

According to a further aspect of this invention, withdrawal of the body part likewise produces an enable signal which permits the machine to operate for some predetermined time thereafter which is greater than the usual time between expected intrusions. Accordingly, if the system is operating properly, the enable signal will be produced continuously and the system quickly responds to malfunctions by preventing further machine operation, thus providing fail-safe operation for the machine operator.

Radio frequency radiation has in the past been coupled to a machine via a human. For example, the patent to Joy et al., U.S. Pat. No. 3,177,481, describes a system in which a train operator sits on a transmitter which couples radiation to his body which is in turn coupled to the train control lever so that, should the engineer's hand fall from the control lever, an alarm is given. The patent to Momberg et al., U.S. Pat. No. 3,218,530 describes an arrangement in which a sewing machine operator is coupled to an rf transmitter operating at a specific frequency by a foot plate that her foot approaches and retreats from, to vary the amplitude of signal which is transmitted through her to the machine speed controller in accordance with the signal amplitude. In neither of these arrangements, however, is there any suggestion of using an antenna to protect a given area of a machine as described in detail below.

This invention finds particular utility in protecting sewing machine operators from accidentally sewing their fingers, a painful and disabling injury, without substantially interfering with sewing. This is accomplished by mounting a loop antenna about the foot and needle assembly so that the machine cannot operate while the operator's fingers are within a predetermined distance from the antenna.

The invention, however, finds utility in other applications. For example, the invention can be used with cutting and grinding machines. It can be used with furniture cutting machines and similar machines.

Many other objects and purposes of this invention will be clear from the following detailed description of the drawings.

BRIEF DESCRIPTION OF THE DRAWINGS

FIG. 1 shows a schematic view of the invention of this application mounted on a sewing machine;
FIG. 2 shows in detail the transmitter circuit.

DETAILED DESCRIPTION OF DRAWINGS

Figure 3:
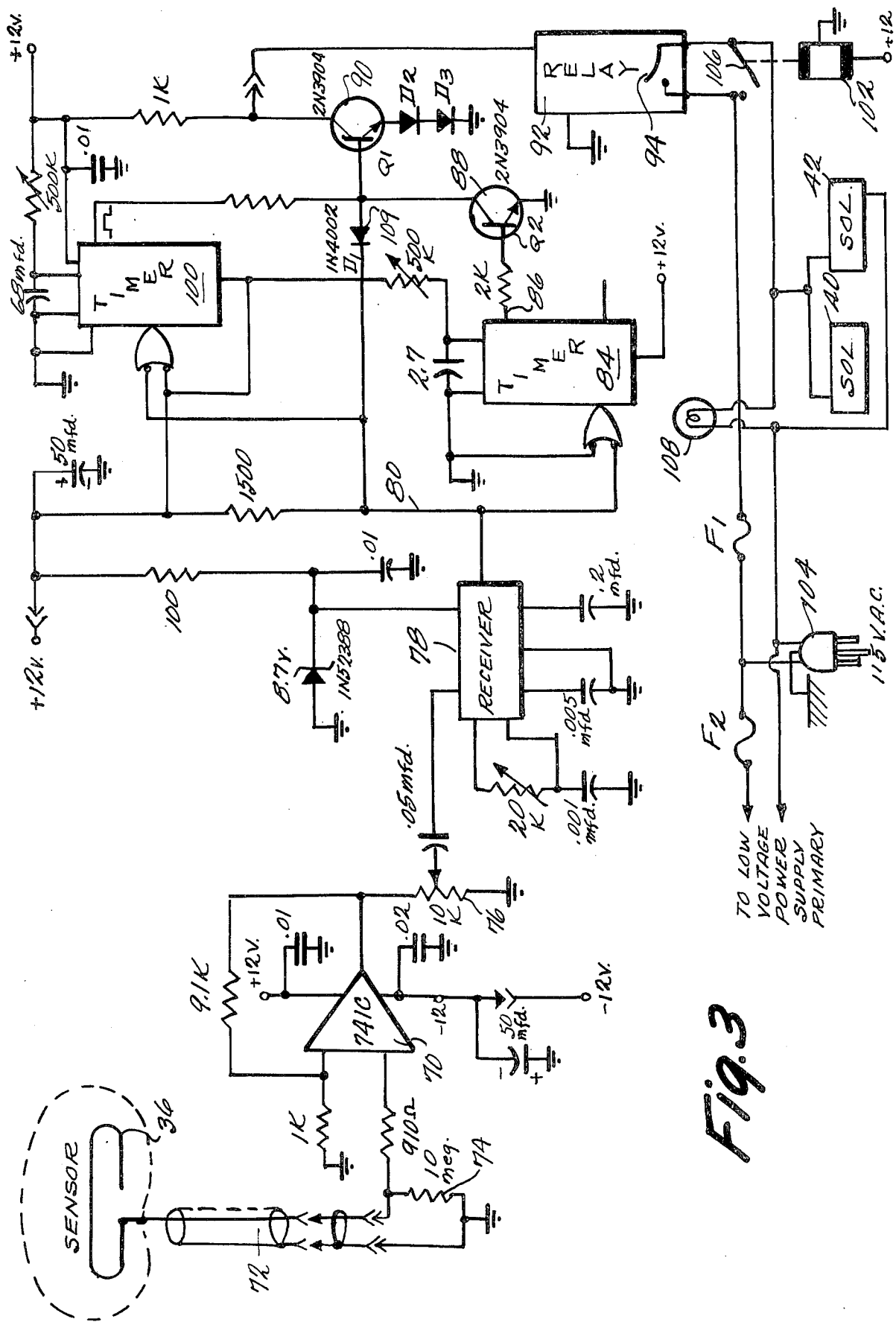
FIG. 3 shows in detail the control circuit.

Reference is now made to FIG. 1 which schematically illustrates one application of the unique system of this invention which has been found to be of particular utility, namely, protection of a sewing machine operator. Since such machines are usually operated at breakneck speed, the danger is always present of accidentally driving the needle through the operator's fingers, an excruciatingly painful and debilitating injury. The operator 20 usually sits on a cushion 22 before the sewing machine 24, which includes a foot 26 and sewing needle assembly 28. Foot 26 and assembly 28 are operated by a foot pedal 30 which conventionally the operator depresses half-way to move the foot down to hold the material and all the way down to cause the needle to sew. For sewing drapery pleats or the like, the operator may insert and remove her fingers from the danger area around the assembly 28 as often as twenty times per minute.

According to this invention, it is virtually impossible for the operator to sew her fingers while at the same time the operator's actions are not impeded by bulky sensors. It has been found in fact that operator efficiency rises when a system of this type is installed, perhaps because fear of injury need no longer slow the operator or the required full withdrawal of fingers promotes better work habits. Transmitter 32, shown in detail in FIG. 2, produces a radio frequency signal which is coupled by a coaxial cable or the like to a metal plate 34 disposed within cushion 22. Plate 34 preferably is sized so as to be covered by all operators, regardless of their size. 8 inches square has been found satisfactory. If convenient, the operator can stand on plate 34 rather than sit.

As the operator's fingers approach wire antenna 36, the sensor begins to detect and conduct a radio frequency signal, the amplitude of which is a direct function of the distance of the fingers from antenna 36. Antenna 36 can be shaped and sized to produce any desired field configuration. For example, antenna 36 may be a straight wire, or any electrical conductor shaped and located to provide optimum protection for a given working area. It may even be a machine component insulated from the grounded machine. On the sewing machine detailed herein, the antenna is in the shape of a small open-ended loop overlying the needle area of the sewing platform and attached to the presser foot, thereby guarding the needle and presser foot danger zone. Antenna 36 is connected to control circuit 38, shown in detail in FIG. 3, which operates solenoids 40 and 42 when the amplitude of the signal on antenna 36 exceeds a predetermined level indicating the operator's hands have entered an area considered dangerous. Circuits 38 and 32 are preferably mounted in a suitable housing adjacent machine 24. Solenoid 40 when operated prevents the operator from depressing pedal 30 to the full down position and if it is in that position, kicks pedal 30 back to the intermediate position. Solenoid 42 immediately brakes machine 24 to a halt.

Reference is now made to FIG. 2 which illustrates the transmitter 32 in detail. A conventional RC controlled oscillator 50 for example of the type sold by Signetics as NE 566, produces an rf signal preferably above 20 khz. A frequency of 100 khz is convenient since it is below commercial broadcasting frequencies and is not used otherwise in any way likely to generate signals which would be picked up by antenna 36. The frequency output of oscillator 50 can be varied by resistor 52.

The triangular output produced by oscillator 50 is applied via adjustable resistor 54 to operational amplifier 56. The output of amplifier 56 is in turn coupled to stainless steel plate 34 via coaxial cable 60.

Any suitable insulating material of the type found in cushions can be used to separate plate 34 from the buttocks of operator 20.

Referring to FIG. 3, the signals transmitted and capacitively coupled from operator 20 to antenna 36 are applied to a high impedance operational amplifier 70 via coaxial cable 72. The high impedance is desirable to minimize effects of the body on the signal. Resistor 74 operates to shunt static electricity to ground. The output of amplifier 70 is applied via potentiometer 76 to the input to phase lock loop receiver 78, for example, the receiver NE567 made by Signetics. This type of receiver produces an output shift from one level to another, for example, high to low, corresponding to going from a machine run to a machine stop condition, for instance, when the amplitude of the input exceeds a predetermined level, for example 20-25 millivolts. Thus, potentiometer 76 can be used to adjust the distance to the loop which produces a disable signal. When the predetermined level is exceeded indicating intrusion, the output of receiver 78 on line 80 goes down and remains low until the input drops below the predetermined level.

When the receiver 78 output goes low indicating intrusion, timer 84 is triggered, producing a high output pulse on line 86 which causes transistor 88 to saturate, grounding the base of transistor 90 which is thus maintained non-conductive through diode 109 as long as receiver 78 output is low. Current then flows through relay coil 92, closing its controlled switch 94 which in turn completes the current path through solenoids 40 and 42 which then operate as described above. Timer 84, preferably a retriggerable timer, and most preferably a retriggerable monostable multivibrator timer, ensures positive response and avoids any relay chattering.

Timer 100, which is also preferably a retriggerable timer, and most preferably a retriggerable monostable multivibrator timer, responds to the positive going, trailing edge of the output pulse from receiver 78 by producing a positive pulse of a given duration, for example, ten seconds. Thus, timer 100 produces an enable signal when the intrusion has ceased. Timer 100 is connected to the base of transistor 90, so that the enable pulse renders that transistor conductive and grounds coil 92, preventing operation of solenoids 40 and 42. When timer 100 times out and its output shifts to a low level, transistor 90 becomes nonconductive and current flows through coil 92. Timer 100 thus acts as insurance that the system is operating properly by preventing operation unless intrusion is detected within a time period which is set to relate to the type of machine operation. Since for sewing pleats the operator intrudes roughly once each five seconds, a ten second enable period is satisfactory. Additional fail-safe protection is provided by $D_1$ 109, which guarantees override of timer 100 any time receiver 78 output is low. Operator protection is provided through this means should timer 100 or timer 84 fail.

In the event that machine operation practice does not require normal entry by the human body into the guarded zone or area, timer 100 should be omitted and control transistor 90 forward-biased to the +12-volt source. This has the effect of eliminating the need for the optional self-test insurance feature above.

A further relay separately fused coil 102 is connected to the +12-volt source which powers circuits 38 and 32 and has a controlled switch 106 which is connected in parallel with switch 94 for operating solenoids 40 and 42, should the +12-volt source fail. A lamp 108 is connected in parallel with solenoids 40 and 42 for indicating when an intrusion is occurring.

While the system of this invention finds particular utility in protecting sewing machine operators from injury without interfering with their work, it can also be used in any application where it is desired to detect intrusion of a human part into a given machine area. Many changes and modifications of this invention can, of course, be carried out without departing from the scope of the invention. Accordingly, that scope is intended to be limited only by the scope of the appended claims.

What is claimed is:

1. A system for producing a control signal to stop operation in response to intrusion of a human body part into a given machine area comprising:

means for detecting presence of a human part in said area and producing a first signal in response to intrusion of said part and a second signal in response to removal of said part, means for producing a disable signal in response to said first signal which prevents operation of said machine until said second signal is produced, means for producing an enable signal in response to said second signal for a predetermined time following production of said second signal to permit operation of said machine during said predetermined time and preventing operation thereafter, and means connected to said disable signal producing means for causing said machine to stop in response to said disable signal and connected to said enable signal producing means for causing said machine to stop in response to the absence of said enable signal.

2. A system as in claim 1 wherein said detecting and producing means include:
 means for producing a radio frequency electrical signal at a predetermined frequency,
 means for coupling said signal to a human machine operator,
 antenna means mounted within said area to be protected and shaped to guard said area, and
 means connected to said antenna means for receiving electrical signals detected by said antenna means, and producing said first signal only if the received signal is at a certain frequency and the amplitude of the received signal exceeds a predetermined level.

3. A system as in claim 2 wherein said producing means includes an RC controlled oscillator, means for varying the frequency of said oscillator and means for amplifying the output of said oscillator and wherein said coupling means includes a metal plate and a coaxial cable connecting said plate to the output of said amplifying means.

4. A system as in claim 2 wherein said antenna means is a loop of metal wire.

5. A system as in claim 2 wherein said receiving and producing means includes means for amplifying the signals detected by said antenna means, a phase lock loop receiver connected to the output of said amplifying means for producing a disable output signal when the amplitude of the input signal exceeds a predetermined value, a first timer connected to said receiver for producing a disable pulse in response to said disable output signal, a second timer connected to said receiver for producing an enable pulse in response to cessation of said output signal, a control transistor connected to said receiver and said first and second timers for shifting from a first to second condition upon production of said output signal and said disable pulse and from said second to said first condition upon production of said enable pulse and a diode connected between said receiver and said control transistor for ensuring that said transistor shifts to said second condition upon production of said output signal.

6. A system as in claim 5 including a control relay connected to said transistor for closing a controlled switch in response to said transistor shifting to said second condition, and at least one solenoid means connected to said controlled switch for operation in response to closing said switch to disable said machine.

7. A system as in claim 6 including a further relay connected to a power source and having a controlled switch connected in parallel with the controlled switch of said control relay for causing operation of said solenoid in the event of failure of the receiver/transmitter power source.

8. A system as in claim 2 wherein said radio frequency signal producing means includes means for producing a signal at a frequency greater than 20 khz.

9. A system for controlling operation of a sewing machine having a foot which holds cloth to be sewed and a sewing needle assembly comprising:
 an antenna extending around said foot and assembly,
 means for producing a radio frequency signal at a predetermined frequency,
 a metal plate connected to said producing means and arranged to be adjacent the human sewing machine operator so as to capacitively couple said radio frequency signal to said human operator so that approach of a part of said operator to said antenna produces a radio frequency signal in said antenna and withdrawal of a part causes cessation of said radio frequency signal in said antenna,
 circuit means connected to said antenna for receiving said radio frequency signal and producing a machine disable signal when the amplitude of the received signal exceeds a predetermined level and is roughly at said predetermined frequency,
 means for producing a disable signal in response to said signal which prevents operation of said machine until said withdrawal of said signal,
 means for producing an enable signal in response to said signal for a predetermined time following production of said signal to permit operation of said machine during said predetermined time and preventing operation thereafter, and
 means connected to said disable signal producing means for causing said machine to stop in response to said disable signal and connected to said enable signal producing means for causing said machine to stop in response to the absence of said enable signal.

10. A system as in claim 9 wherein said producing means includes an RC controlled oscillator, means for varying the frequency of said oscillator and means for amplifying the output of said oscillator and wherein said coupling means includes a metal plate and a coaxial cable connecting said plate to the output of said amplifying means.

11. A system as in claim 9 wherein said antenna means is a loop of metal wire.

12. A system as in claim 9 wherein said circuit means includes means for amplifying the signals detected by said antenna means, a phase lock loop receiver connected to the output of said amplifying means for producing a disable output signal when the amplitude of the input signal exceeds a predetermined value, a first timer connected to said receiver for producing a disable pulse in response to said disable output signal, a second timer connected to said receiver for producing an enable pulse in response to cessation of said output signal, a control transistor connected to said receiver and said first and second timers for shifting from a first to second condition upon production of said output signal and said disable pulse and from said second to said first condition upon production of said enable pulse and a diode connected between said receiver and said control transistor for ensuring that said transistor shifts to said second condition upon production of said output signal.

13. A system as in claim 12 including a control relay connected to said transistor for closing a controlled switch in response to said transistor shifting to said second condition, and at least one solenoid means connected to said controlled switch for operation in response to closing said switch to disable said machine.

14. A system as in claim 13 including a further relay connected to a power source and having a controlled switch connected in parallel with the controlled switch of said control relay for causing operation of said solenoid in the event of failure of the receiver/transmitter power source.

15. A system as in claim 9 wherein said radio frequency signal producing means includes means for producing a signal at a frequency greater than 20 khz.

16. A system as in claim 15 wherein said radio frequency signal producing means includes means for producing a signal at substantially 100 khz.

* * * * *